May 7, 1929.  H. STEINBRUGGE  1,711,704
ROAD MOTOR VEHICLE BODY AND METHOD OF MAKING SAME
Filed Sept. 30, 1925  3 Sheets-Sheet 1
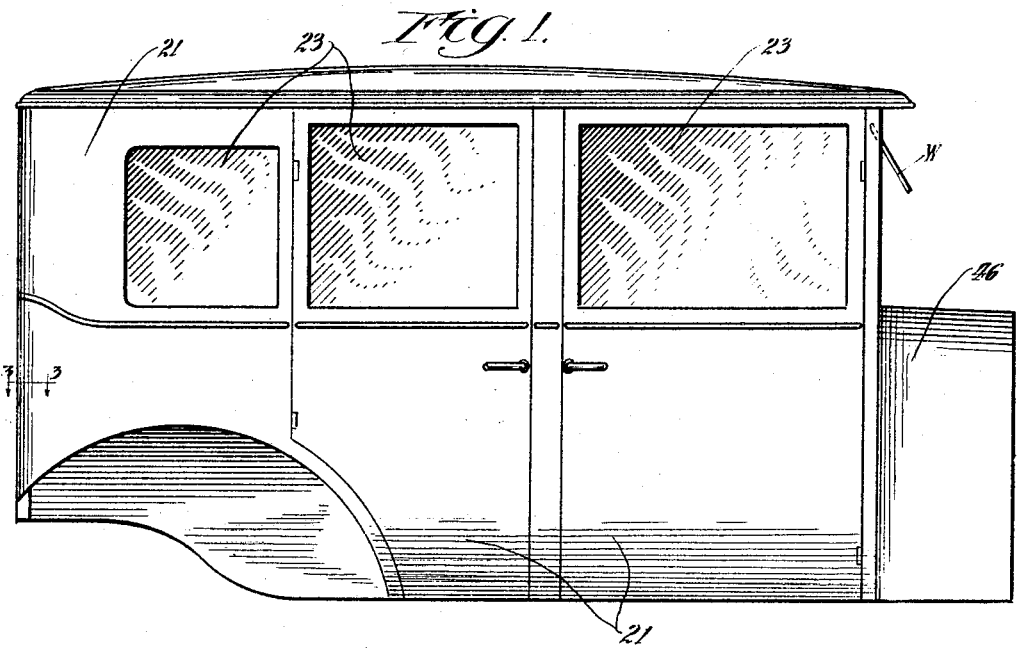
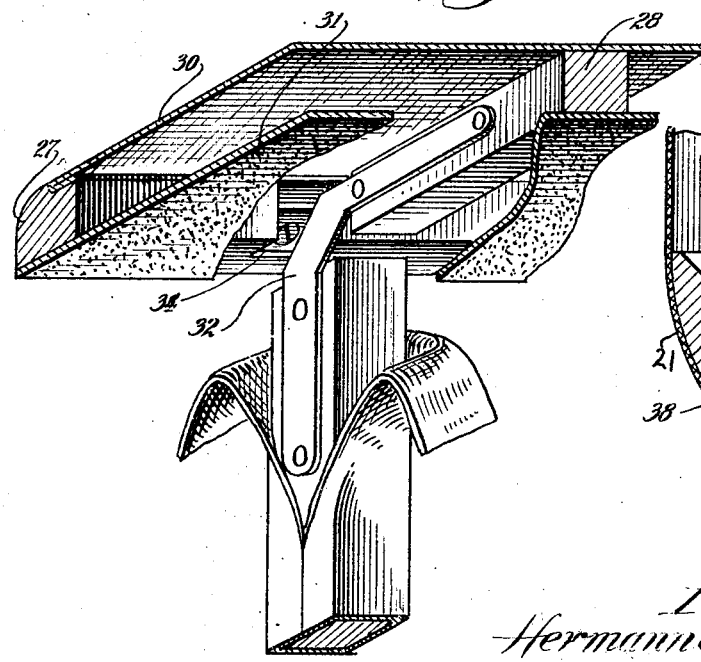
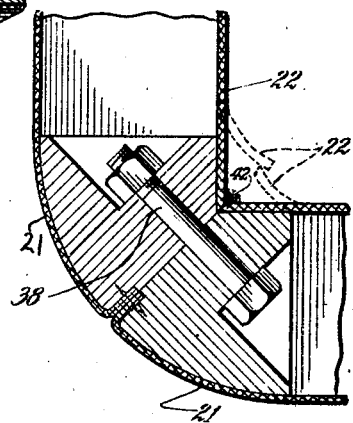
Inventor
Hermann Steinbrugge.

May 7, 1929. H. STEINBRUGGE 1,711,704
ROAD MOTOR VEHICLE BODY AND METHOD OF MAKING SAME
Filed Sept. 30, 1925  3 Sheets-Sheet 2
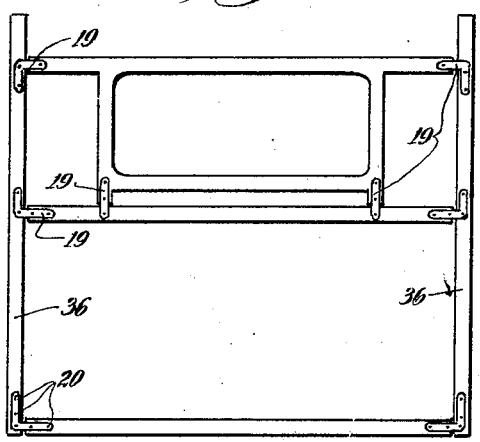
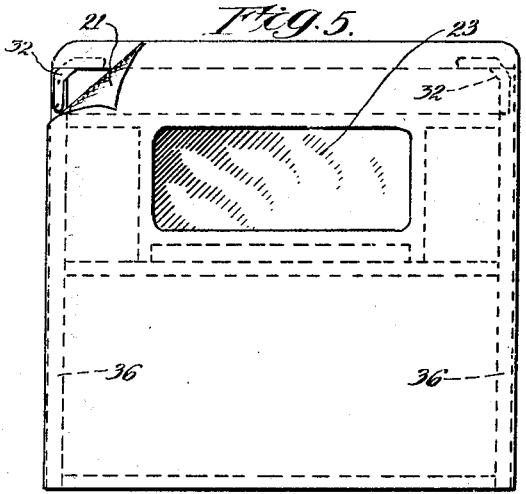
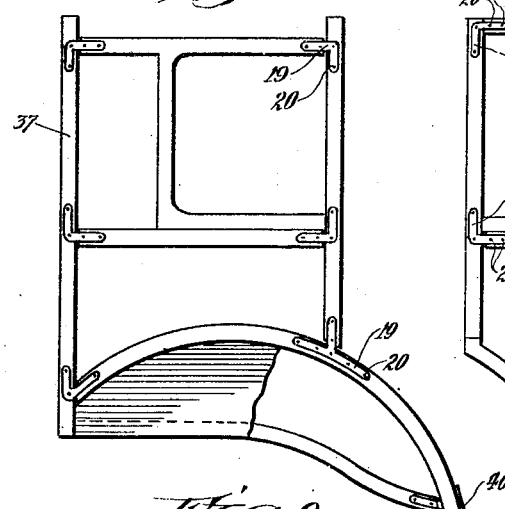
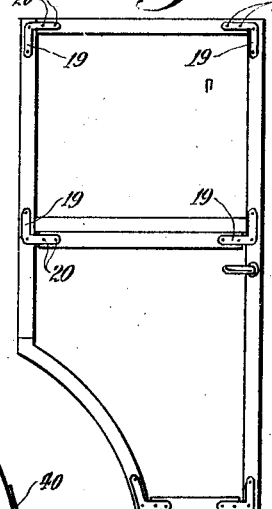
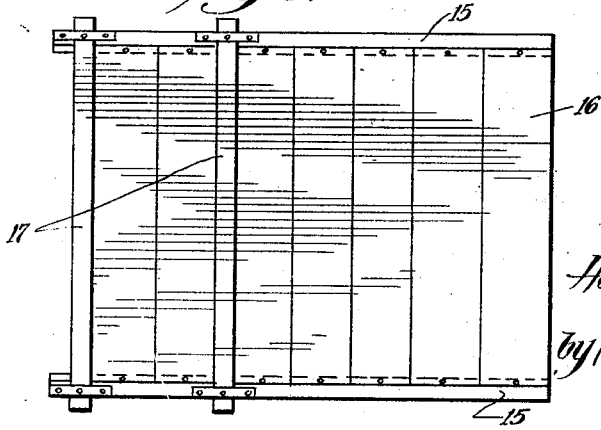
Inventor;
Hermann Steinbrugge
By Preston, Hilker, Davis & Macaulay
Attys

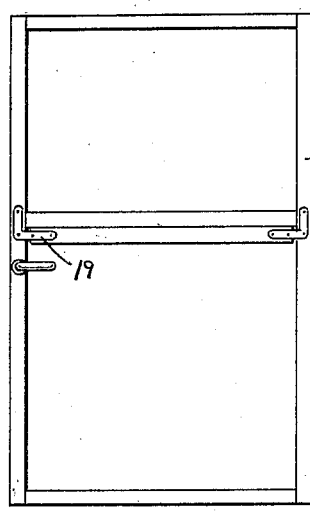
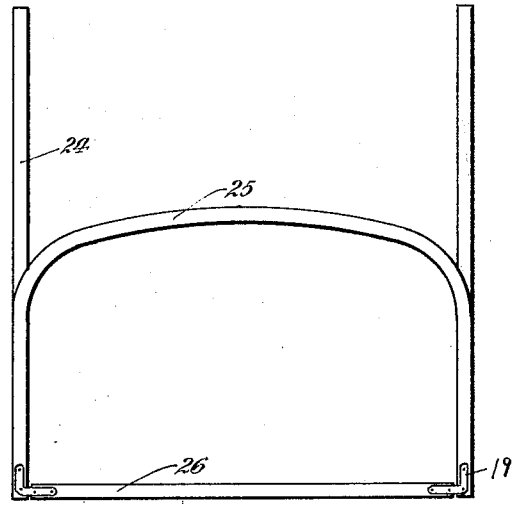
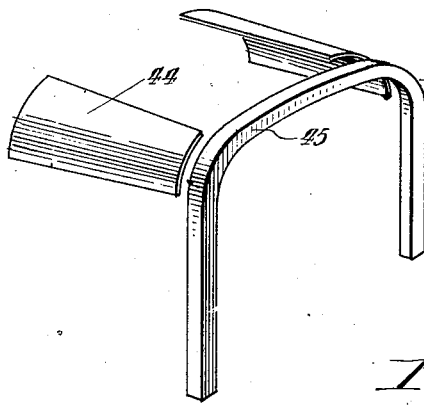
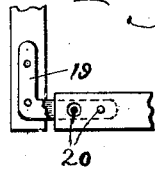
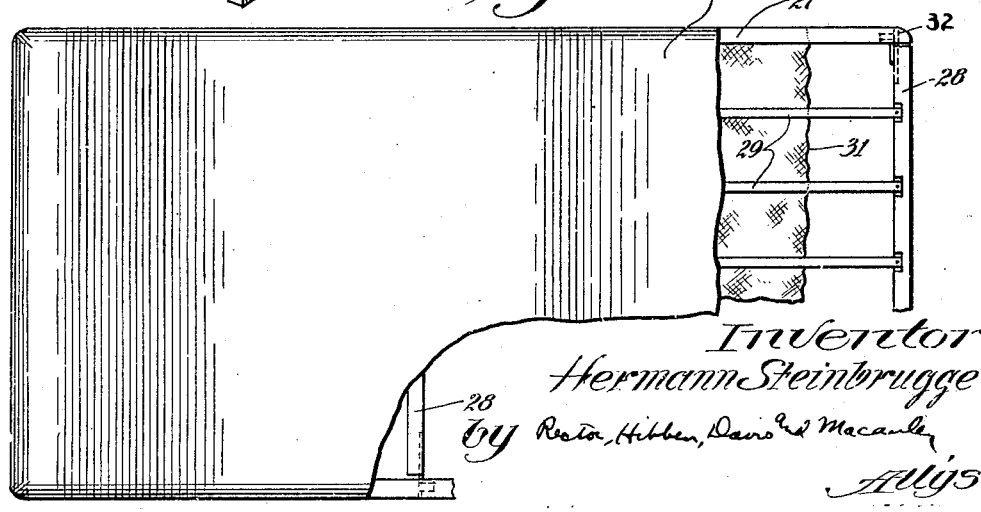

Patented May 7, 1929.

1,711,704

UNITED STATES PATENT OFFICE.

HERMANN STEINBRUGGE, OF NEW YORK, N. Y., ASSIGNOR TO CHARLES TORRES WEYMANN, OF PARIS, FRANCE.

ROAD-MOTOR-VEHICLE BODY AND METHOD OF MAKING SAME.

Application filed September 30, 1925. Serial No. 59,465.

My invention relates to vehicle bodies, and more particularly to bodies of the closed type for passenger automobiles and the like.

As is well known, automobile manufacturers build their automobile bodies piece-by-piece, the entire skeleton frame being first constructed and then exteriorly covered by sheet metal panels and lined or upholstered on the inside. The cost of shipping such completed automobile bodies to their places of destination is very expensive and troublesome, as they occupy considerable space and are difficult to secure in position in freight cars and the like. Bodies so constructed are also very difficult to repair when they have been damaged in collisions or otherwise. The principal object of my invention is to so construct an automobile body that it may be formed of individually fabricated and finished sections, units or panels which may be readily boxed or crated for shipment and easily assembled together at the place of destination, thus permitting transportation of the body in a knocked-down condition and its assembly at minimum cost and labor, and also materially reducing the expense and difficulty of repair.

This invention is peculiarly, though not necessarily, adapted for embodiment in the Weymann flexible type of body which is exemplified in the United States Patent No. 1,519,093, granted December 9, 1924, and in the accompanying drawings I have illustrated the invention applied to that type of body.

A more specific object of my invention is to provide the rear side panels and the back panel with partial corner posts which are united together in the assembled body to form complete corner posts.

Still another object of my invention is to leave portions of the finishing coverings of the panels or sections loose or free to permit expeditious connection of the units together and concealment of the connecting means by the coverings.

With the above and incidental objects in view, the invention consists in certain novel features of construction and combination of parts, the essential elements of which are recited in the appended claims and the preferred form of embodiment of which is described in detail hereinafter and illustrated in full in the accompanying drawings, which form part of this specification.

Of said drawings, Figure 1 is a side view of a body adapted to incorporate my invention; Fig. 2 is a fragmentary perspective view showing the method of connecting the top to the supporting posts and panels; Fig. 3 is a horizontal detail section taken through a completed rear corner post as on the line 3—3 of Fig. 1; Fig. 4 is a rear elevation of the skeleton frame of the back panel; Fig. 5 is a rear elevation of the body with one corner of the flexible covering on the back panel turned back; Figs. 6 and 7 are side elevations of the skeleton frames of one of the side panels and one of the rear doors, respectively; Fig. 8 is a side elevation of one of the posts between the doors; Fig. 9 is a top plan view of the floor unit; Fig. 10 is a side elevation of the skeleton frame of one of the front doors; Fig. 11 is a front elevation of the front panel; Fig. 12 is a perspective view showing the members forming the cowl frame in separated relation; Fig. 13 is a top plan view of the top with parts broken away; and Fig. 14 is a detail view illustrating more clearly a Weymann flexible joint, one of the brackets being broken away.

Each of the units or sections of the body having the skeleton frames shown in Figs. 4, 6 to 11, inclusive, and 13 is separately or individually formed and finished.

The floor unit (Fig. 9) comprises the side rails 15, floor boards 16 and two cross bars 17, the ends of which extend slightly beyond the side rails.

The skeleton frame of the back panel (Figs. 4 and 5), of each of the rear side panels (Fig. 6) and of each of the doors (Figs. 7 and 10) comprises vertical and horizontal wooden members or pieces preferably connected together by Weymann joints consisting of brackets 19 which are formed of thin metal and secured to the parts by means of screws or bolts 20. One of these Weymann joints is illustrated in detail in Fig. 14, where it will be noted that at the points of connection of the wooden frame members a slight space or gap is provided so that the wooden members are out of contact with each other.

After the skeleton frame of each of these units or panels is formed, it is then covered on the outside by a flexible covering 21 (Figs. 1 and 5), which may be of leather or other suitable material and a panel of glass 23 is fitted to and secured in position in the window space formed by the skeleton frame. The inside of each of these panels is then completed or finished by means of the lining 22 (Fig. 3) or otherwise.

The frame of the front panel comprises the front corner posts 24, a connecting bow 25 and a bottom cross piece 26. This front panel carries the windshield W (Fig. 1) in the usual way.

The skeleton frame of the top (Fig. 13) comprises the side rails 27, a number of cross bows 28, and longitudinal strips 29 and over the frame is stretched a water-proof covering 30. The top is lined on the inside by a lining 31, as best shown in Fig. 2. The side rails 27 and cross bows 28 are secured together by metal brackets 32, preferably of the Weymann type, which have horizontal legs connected to the cross bows, laterally extending inclined lugs 34 secured to the rails 27 and downwardly extending legs.

As shown in Fig. 2, the supporting post between the doors on each side of the body is wrapped or covered by the same kind of flexible material as that on the exterior of the side panels, and in the assembled body the upper ends of these posts are connected to the downwardly extending legs of two of the brackets 32. In a like manner, the upper ends of the vertical post members of the rear side panels and of the front and back panels are connected to and support the top. The upper corners of the exterior coverings on the side and back panels are left loose or free, as illustrated in Fig. 5, and the upper ends of the coverings on the posts between the doors and on the vertical posts of the front panel are turned back, as illustrated in Fig. 2, to facilitate attachment of the top in place when the body is assembled.

In order to secure the back panel and the rear side panels firmly together in the assembled body and to provide rigid supporting corner posts the vertical pieces 36 (Fig. 4) of the back panel and the rear vertical pieces 37 (Fig. 6) of the rear side panels are formed as half-posts so that when the panels are brought together, as shown in Fig. 3, these pieces 36 and 37 form complete or unitary posts, the pieces 36 and 37 being secured together as by means of bolts 38.

From the foregoing description, the construction of and method of manufacturing a body incorporating my invention will be obvious. Each of the units is individually or separately made and practically completed, as described. The panels or units may be expeditiously packed in a pile or superimposed position in a crate or box and thus the body may be quickly packed and shipped at very much less expense than can a completely assembled body. The units may then be easily assembled, by unskilled mechanics by merely connecting the units together by the brackets and joints and tacking down or otherwise securing the free corners or edges of the coverings. The bottom of the front panel is secured to the front end of the floor, the vertical posts between the panels are secured, preferably by Weymann joints, to the ends of the front cross bar 17 and the forward lower corners of the rear side panels are connected to the rear cross bar 17 as by brackets 40 (Fig. 6). The half-posts of the back panel are connected to the half-posts of the side rear panels by the bolts 38. In order to permit this form of connection, the adjacent edges of the inside lining 22 are not fastened (as indicated in dotted lines in Fig. 3) when the panels are separately made so that the bolts may be inserted through the holes in the members 36 and 37, after which the free edges of the linings are secured to the corner posts and the edges may finally be concealed by a welt 42, if desired. The meeting vertical edge portions of the coverings 21 on the side panels and the back panel are turned inwardly and positioned between the members 36 and 37. The top is next mounted in place and secured to the corner posts and the intermediate posts by means of the brackets 32. The parts of the flexible coverings at the tops of the posts, which are left loose to permit this attachment, are then secured in place and conceal the parts of the brackets covered thereby. The metal corner pieces 44 (Fig. 12) of the cowl frame are then secured to the bow 25 and the cowl bow 45 by nails or otherwise and this cowl frame is next covered by a suitable covering 46 (Fig. 1). The doors are then hung on the proper posts by means of hinges, which completes the assembly of the body.

It will be observed that if any of the sections or units is injured, it may be readily removed from the body and repaired or replaced. This permits very easy and inexpensive repair of the parts.

While I have shown and described but one form of embodiment of my invention, it will be obvious that various modifications may be made without departing from the spirit of my invention.

I claim:

1. In an automobile body, the combination of individual units permitting the body to be shipped in knocked-down condition and consisting of a top, a floor, and side panels separately formed and finished and each comprising a frame and a flexible covering with free or loose parts, and means for securing the said units together in assembled relation, the free parts of the coverings being secured in position to conceal said means.

2. In an automobile body, the combination of individual separately formed and finished units, comprising a top having a skeleton frame and a flexible covering, a floor, and end and side panels each comprising a skeleton frame and a flexible covering having parts free or loose, and brackets for connecting said units together in assembled relation in the automobile body, said brackets being concealed by said loose or free parts of said flexible coverings when secured in position.

3. In an automobile body, the combination of individual units, separately formed and finished and comprising a top unit, side panels each comprising a skeleton frame and a flexible covering with one member of the frame forming part of a corner post, and an end panel comprising a skeleton frame and a flexible covering with a member of the frame at each side forming the other parts of the corner posts, means for readily securing the top unit to said panels, and means for securing said members forming the complete corner posts together.

4. In an automobile body, the combination of individual side panels and an end panel separately formed and finished and each comprising a skeleton frame and a flexible covering, the frame of each side panel including a member forming half of a corner post and the frame of the end panel including side members forming the other halves of said corner posts, and means for connecting said corner post members together when the units are in assembled relation in the body, parts of the edges of the flexible covering of each of said panels being secured in place between the members forming the corner posts.

5. In an automobile body, the combination of individual side panels, an end panel and a top panel separately formed and finished and each comprising a skeleton frame and a flexible covering, the frame of each side panel including a member forming half of a corner post and the frame of the end panel including side members forming the other halves of said corner posts, means for connecting said corner posts together, and means for connecting the top and side panels when the units are in assembled relation in the body, parts of the coverings being left free or loose in the individual units to permit the securing together of the units, the loose parts then being secured in position.

6. In an automobile body, the combination of individual units comprising a top consisting of a skeleton frame formed of pieces, brackets securing the same together and a flexible covering, and side panels separately formed and each consisting of a frame and a flexible covering, said brackets having portions adapted to be connected to the frames of said side panels and to be covered by parts of the flexible coverings left free in the individual units.

HERMANN STEINBRUGGE.